March 10, 1942. J. E. KENNEDY 2,275,442
MEANS FOR FEEDING AND TREATING MATERIAL
Filed July 12, 1938 3 Sheets-Sheet 1

INVENTOR.
J. E. Kennedy
BY
ATTORNEYS.

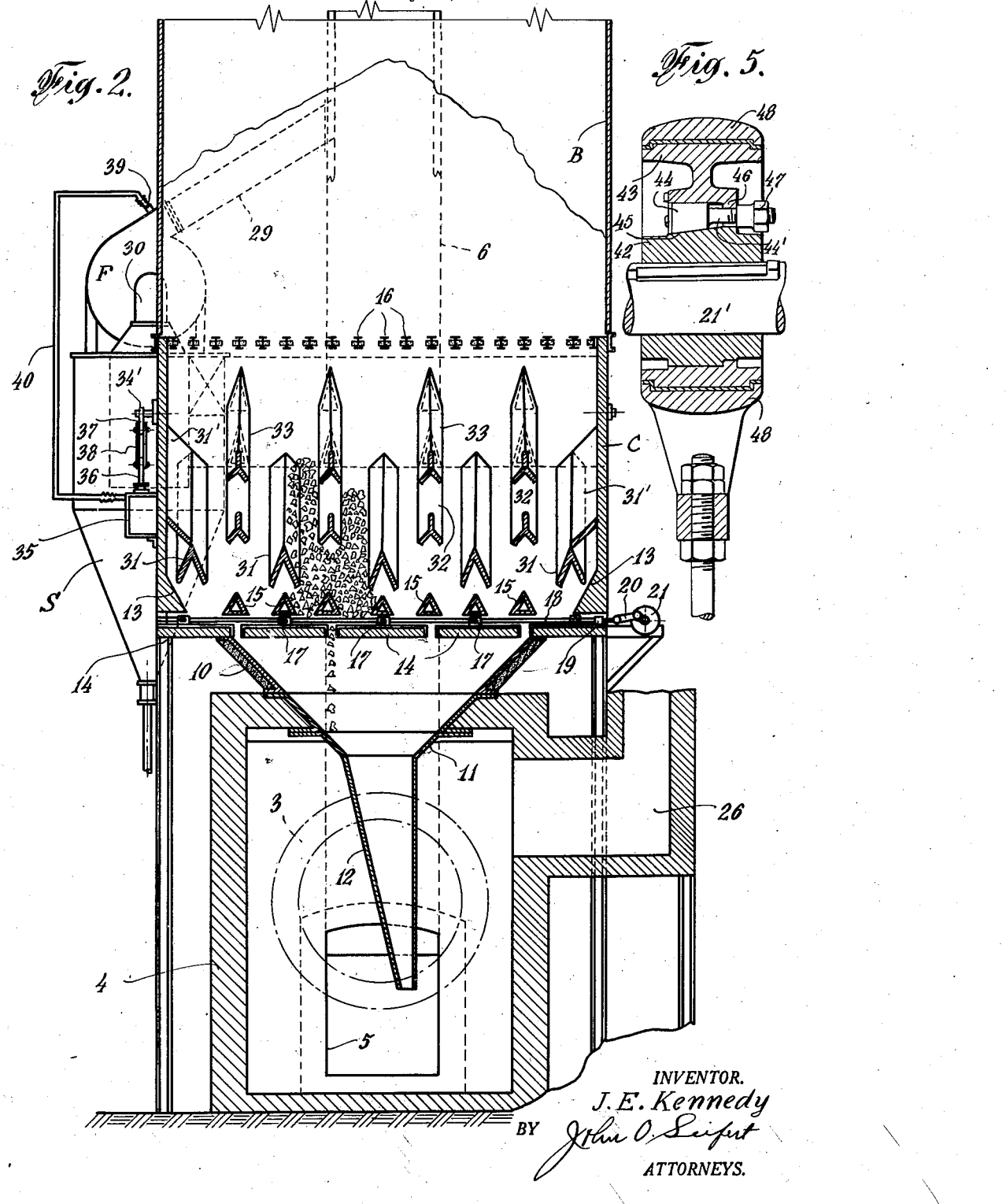

March 10, 1942. J. E. KENNEDY 2,275,442
MEANS FOR FEEDING AND TREATING MATERIAL
Filed July 12, 1938 3 Sheets-Sheet 3
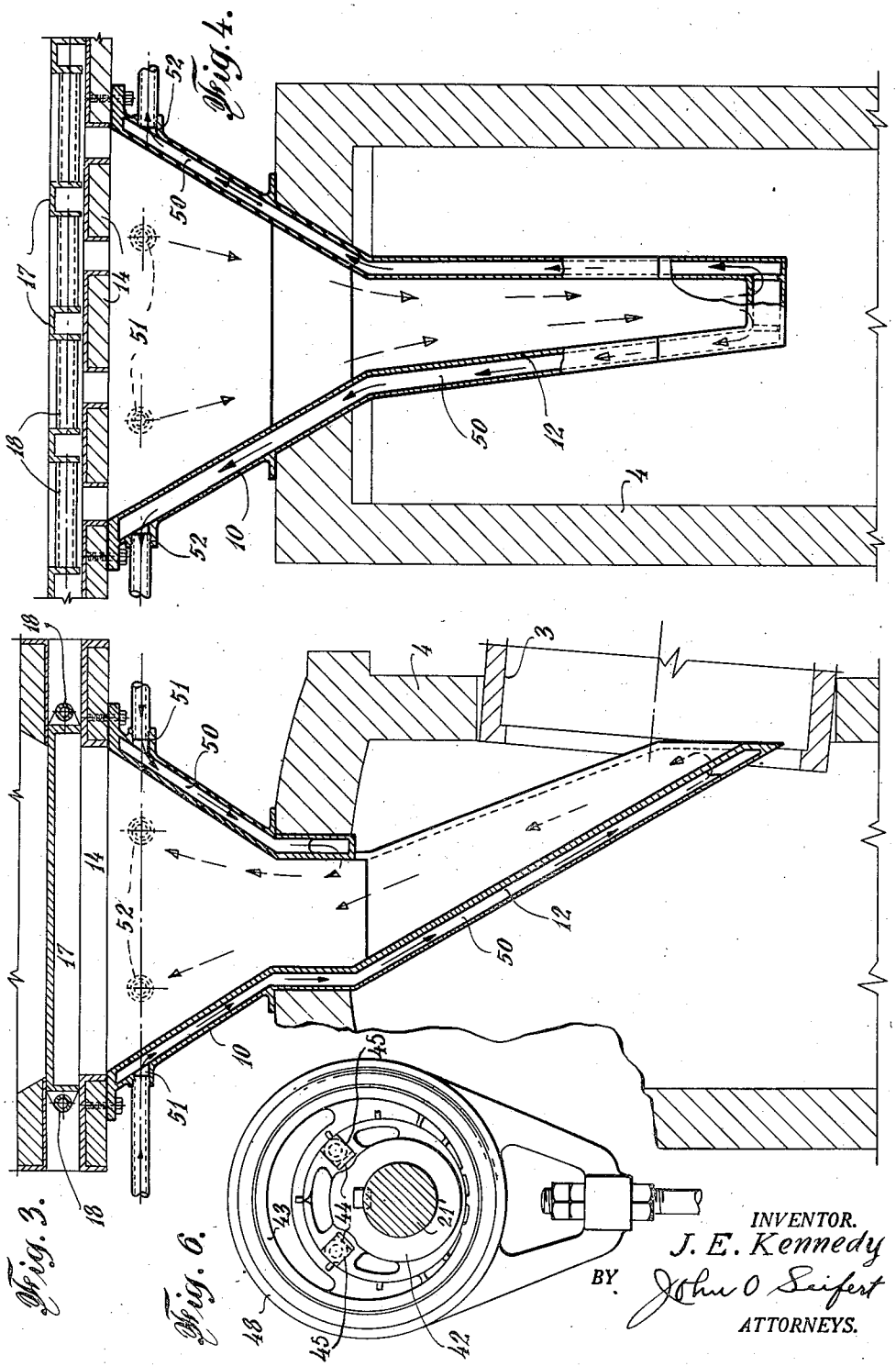
INVENTOR.
J. E. Kennedy
BY John O. Seifert
ATTORNEYS.

Patented Mar. 10, 1942

2,275,442

UNITED STATES PATENT OFFICE 2,275,442

MEANS FOR FEEDING AND TREATING MATERIAL

Joseph E. Kennedy, New York, N. Y., assignor to Kennedy-Van Saun Mfg. & Eng. Corporation, New York, N. Y., a corporation of Delaware Application July 12, 1938, Serial No. 218,812

10 Claims. (Cl. 34—54)

This invention relates to means for recovering the heat of hot waste gases of combustion and utilizing the same for treating material to expel moisture from the material and preheat the same. While the invention is particularly applicable for the recovery and utilizing of hot waste gases of combustion of rotary kilns used in the lime, cement, chemical and allied industries for expelling moisture from material to dry and preheat the material, the invention is also applicable for use in recovering the heat of the hot waste gases of combustion of boiler furnaces utilizing pulverized coal as a fuel for expelling moisture from and drying the coal prior to feeding the coal to pulverizing means for pulverizing the coal preparatory to firing a boiler furnace therewith.

The thermal efficiency of rotary kilns, particularly kilns for calcining limestone, is very low due to the high temperature of the gases or products of combustion exiting from the kiln to the stack. The ordinary lime kiln utilizes the heat of the gases of combustion from 1500° to 2500° F., in calcining limestone, and approximately up to one-half of the heat of the gases of combustion is lost by exiting from the feed and discharge ends of the kiln to the stack. It has been contemplated to recover the heat of part of the hot waste gases of combustion and increase the heat efficiency of the kiln by increasing the length of the shell of the kiln. However, this resulted in as great a heat loss by radiation of the heat from the shell of the kiln as is recovered from the hot gases exiting from the kiln to the stack and the saving in the loss of the hot gases is insufficient to warrant the increased cost of installation and operation of the kiln, as well as the additional space required for the installation. The high loss of the hot gases of combustion in the operation of kilns has also resulted in the development of different types of cumbersome heat recovery apparatus, such as heat exchangers, and the construction of elaborate plants to utilize the waste hot gases of combustion to generate steam.

It is the primary object of the invention to provide means for use in connection with rotary lime calcining kilns, to utilize the hot gases of combustion exiting from the kiln to expel moisture from and preheat the limestone and operative to feed the limestone in its preheated condition into the kiln.

It is a further object of the invention to provide improved means to feed limestone to rotary limestone calcining kilns including means to provide a bed of the limestone and cause the hot gases of combustion exiting from the kiln to pass through the voids or spaces between the limestone of said bed and expel moisture from the limestone to dry and preheat the limestone and feed the limestone in preheated or precalcined condition to the kiln.

It is another object of the invention to provide improved means to feed limestone into a rotary kiln to calcine the same including means to provide a bed of the limestone and induce the flow of the hot gases of combustion exiting from the kiln through the voids or spaces between the limestone of a portion of the bed of limestone to dry and preheat the limestone preparatory to feeding the same to the kiln to be calcined and cause the gases passing through said bed of limestone to flow to a stack, and the provision of means, controlled by the temperature of the gases passing through the stack, operative to cause the gases to pass through the voids or spaces between the limestone of a greater or less thickness of the bed of limestone and proportional to the temperature of the gases exiting through the stack.

A further object of the invention is to provide means for use in conjunction with a rotary limestone calcining kiln to feed limestone to the kiln, including means interposed in the connection of the kiln with a stack to provide a bed of the limestone and cause the hot gases of combustion exiting from the kiln to pass therethrough in their passage to the stack to expel moisture from and preheat the same, and the provision of a separator through which the gases are caused to pass in their passage from the bed of limestone to the stack to separate from the gases material entrained therewith in their passage through the bed of limestone.

Other objects and advantages of the invention will hereinafter appear.

In the drawings,

Figure 2 is a sectional view taken on line 2—2 of Figure 1.

Figures 3 and 4 are sectional views showing modified arrangement of chutes for delivering material into the kiln; and Figures 5 and 6 are sectional views showing means for adjusting the actuating means for the feeding means to feed material to the kiln.

Figure 1:
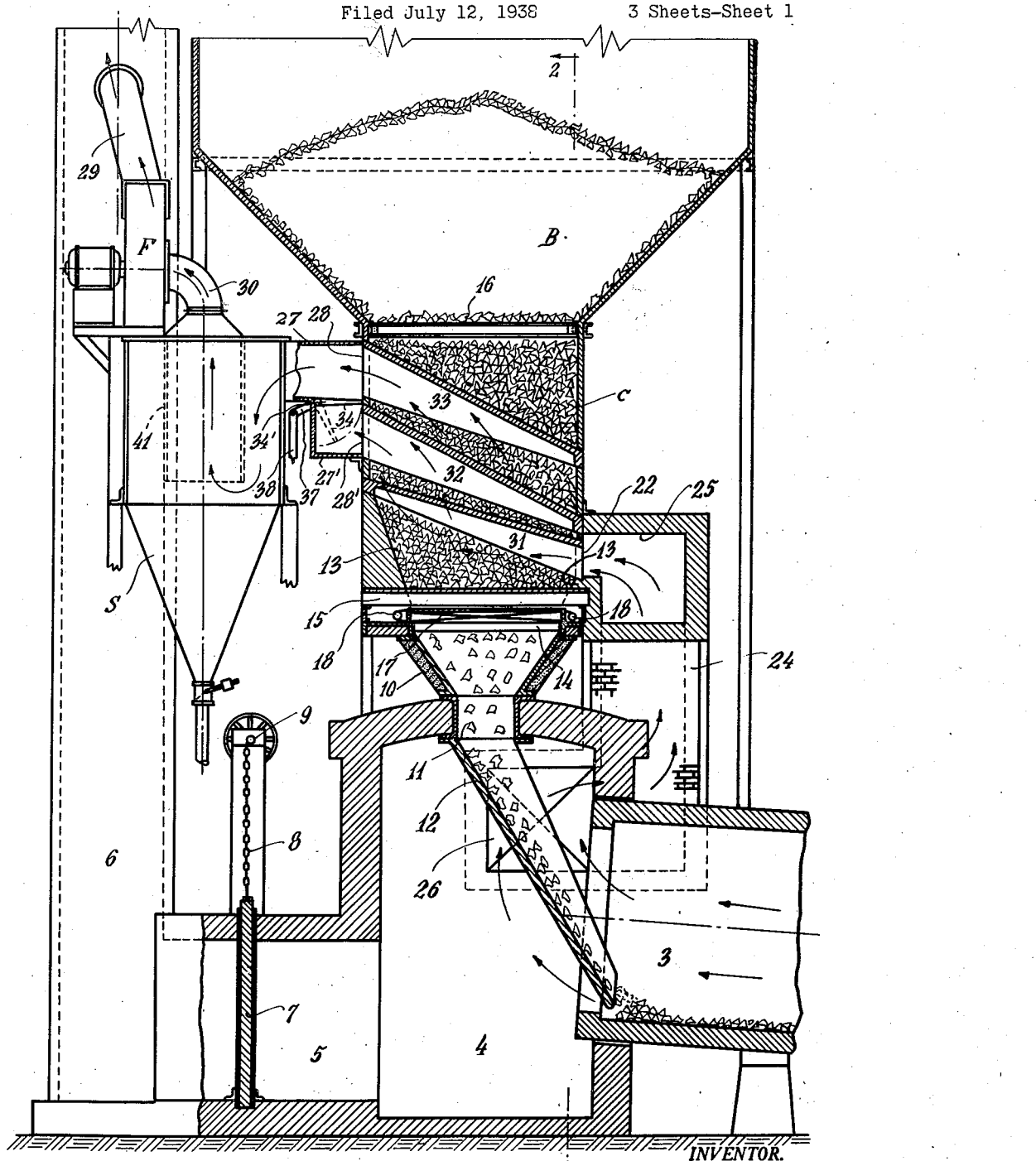
Figure 1 is a longitudinal sectional view showing an embodiment of the invention in connection with a kiln.

In the drawings there is illustrated an embodiment of the invention applied to a rotary limestone calcining kiln including a rotatable cylindrical shell 3, only the inlet end of the shell of the kiln through which the hot gases of combustion are exhausted and the limestone is fed into the kiln is shown and which is sufficient for an understanding of the application of the invention to a rotary kiln. The end of the shell is engaged in an opening and opens to the chamber in a housing 4 having a connection 5 from the lower portion with a stack is regulated by a damper or plate 7 slidably supported at opposite ends to have movement transversely of the connecting means 5. The damper is actuated to control the connection of the housing with the stack by a flexible member 8 connected to a shaft arranged with a hand wheel, as at 9.

A feeding hopper 10 for feeding material into the kiln is supported above and with the outlet thereof opening to the chamber in the housing through the top thereof, as at 11, a chute 12 being connected thereto and extending into the end of the shell 3. The material, such as limestone, to be fed to the kiln is delivered to the feeding hopper 10 from a bin B having a hopper outlet superposed to the feeding hopper and the hopper outlet of the bin connected in communication with the feeding hopper through an oblong casing C open and in communication at the top with the hopper outlet of the bin. The casing is open at the bottom and communicates with the inlet to the feeding hopper and arranged on the inside with wall portions converging from the sides to the open bottom, as at 13. The casing is provided with a grate bottom comprising fixed flat members 14 extending in laterally spaced relation transversely of the casing, and a second row of bars 15 spaced laterally of the casing and extending in superposed parallel relation to the members 14. The bars 15 are of triangular form in cross section, the angle portions being of a width substantially one-third the width of the grate members 14 and supported with an angle face disposed in a horizontal plane and arranged whereby certain of the members 15 are disposed midway the width or sides of the grate members 14 and others bridging the spaces between said members 14. The bars 15 serve to direct the material in the casing onto the lateral portions of the grate members 14 and co-operate with the grate members to support a bed of material in the casing. To relieve the members 14 and bars 15 of the load of the material in the bin and permit material to move by gravity from the bin into the casing the hopper outlet of the bin is also provided with a grating comprising laterally spaced bars 16, shown as of I beam form extending transversely of the bottom of the hopper outlet of the bin and the top of the casing. The material passing between the bars 15 is directed due to the angular form and arrangement of said bars onto the members 14, and means are provided to eject the material from the members 14 through the spaces between said members and into the feeding hopper. This means comprises ejector bars 17 of less width than the bars 15 disposed below the bars 15 and midway the sides of the members 14 and adapted to be reciprocated transversely of and below the bars 15. The ejector bars are connected at the ends to rods 18 fixed at one end to a connecting head 20 connected, as at 19, to a member embracing the periphery of a disk eccentrically mounted on a shaft, as at 21, rotated from a suitable source of power, not shown. As the ejector bars 17 are reciprocated from the rotation of the eccentric means 21 the material directed onto the members 14 by the bars 15 is moved from the opposite sides thereof to the spaces between said members and drops through said spaces by gravity into the feeding hopper.

By arranging the hopper outlet of the bin with the grating 16 the casing is relieved of the load of material in the bin but at the same time permitting the material to gravitate through the spaces between the grate bars 16 into the casing. Also by arranging the casing C with the grate bottom 14, 15 as described, and the provision of the means to eject the material from the bars 14 into the feeding hopper, a bed of the material substantially filling the casing will be retained in and moved progressively downward through the casing.

To expel moisture from the material and preheat the same, and in effect partially calcining the material when it consists of limestone preliminary to delivering the material into the feeding hopper and feeding the same to the kiln, means are provided to cause the waste hot gases of combustion exiting from the kiln to pass through the casing and the voids or spaces between the limestone therein to subject the same to the action of the hot gases to exchange or transfer the heat from the gases to the material. For this purpose the casing is provided with a row of inlet openings 22, preferably in a side of and adjacent the bottom of the casing, connected in communication with the chamber in the housing 4 through the duct or conduit 24 connected at one end to the side of the casing with the outlet of the conduit in communication with the inlet openings 22 to the casing, as at 25, and at the opposite end connected in communication with an opening in the housing adjacent the top thereof, as at 26. The hot gases of combustion exiting from the kiln and received in the chamber of the housing 4 are induced to flow from the housing through the conduit 24 into the casing through the inlet openings 22 and through the casing to outlet means 27 in communication with two rows of outlet openings 28, 28' adjacent the top and in the side of the casing opposite the side with the inlet openings 22 and thence to the stack 6, the gas flowing through the outlet means to the stack 6. This means, as shown, comprises a fan F the outlet of which is connected through a conduit 29 with the stack and the inlet connected through a conduit 30 to the outlet of a separator S to the inlet of which the outlet means 27 of the casing is connected.

Means are arranged in the casing C to facilitate the flow of the gases through the voids or spaces between the bed of the material in the casing and to subject the material to the action of the gases to utilize the greater portion of the heat of the gases to preheat the material preliminary to delivering the material from the casing to the feeding hopper. This means comprises a series of rows of channel members, shown as three in number, 31, 32 and 33. The channel members, as shown, are of V shape in cross section and tapering from one end to the opposite end with the channels opening through the end of greater cross section and a wall extending transversely of the channel at the smaller end. The members 31, 32, and 33 are mounted in inverted positon to extend transversely of the casing and spaced laterally longitudinally of the casing, and as shown, declining from the side with the gas outlets to the side with the gas inlets. The row of channel members 31 is arranged with the closed end mounted in an opening in and declining from the casing wall with the outlets to a point slightly below the outlet openings 28' to the inlets with the open end engaged in the inlet openings 22 in communication with the conduit 24, as shown in Figure 1. By this arrangement of the members 31 the gases from the conduit enter the open end of the channel of the members 31 and are caused to flow longitudinally of and laterally from the channels of said members and upwardly about the channel walls, through the material above the members 31 into the channel of members 32, as shown by the arrows in Figure 1.

The rows of channel members 32 and 33 extend transversely of the casing parallelly of the members 31 but alternate with said latter members, the row of members 32 being spaced upwardly from and extending relative to the spaces between the members 31, and the row of members 33 arranged in superposed spaced relation to the members or row 32. The rows of members 32 and 33 are arranged reversely to the members of row 31, the closed channel end of the members 32 and 33 being mounted in openings in the wall with the gas inlet openings 22 with the open channel end of the members of row 32 in communication with the outlet 28' and the open channel end of the members of row 33 in communication with the outlets 28. The outlet means 27 of the casing are arranged so that a portion 27' thereof opens to the outlets 28' and at a side thereof communicates with the portion 27 of the outlet means in communication with the outlets 28, and means in the form of a damper 34 is pivotally supported at one longitudinal edge, as at 34', is adapted to shut off or open communication between the portion 27' with the portion 27 of the outlet means and regulate said connection. Should the damper 34 be adjusted to open communication between the portion 27' and the portion 27 of the outlet means, as shown in dotted lines in Figure 1, the greater portion of the gases will flow longitudinally of the channel of members of row 31 and about the channel walls of said members upwardly to the channel of the members of row 32 and longitudinally of the channel of said members 32 to the portion 27 of the outlet means. With the outlet controlling damper 34 in said dotted line position to open communication between the portion 27' with the portion 27 of the outlet means only a portion of the thickness of the bed of the material in the casing C, or the material of a thickness equal to the space from the members 32 to the bottom of the casing, is traversed by and subjected to the action of the hot gases flowing through the casing from the gas inlets to the gas outlets 28'. Should the damper 24 be adjusted to close the connection between the portion 27' with the portion 27 of the outlet means all of the gases flowing into the channel of the members 32 are caused to flow over and about the channel walls of said members and pass upwardly to the channel in the members of row 33, the greater portion of the gases then flowing longitudinally of the channel of members 33 to the portion 27 of the outlet means. In this condition of the parts a bed of the material in the casing C of greater thickness and substantially of a thickness equal to the space between the members 33 and the bottom of the casing is traversed by and subjected to the action of the hot gases passing through the casing from the inlets to the outlets for the gases.

By arranging the rows of members 31, 32 and 33 of V shape channel form and mounting the members in inverted position in the casing C the material above said members is caused to gravitate over the opposite channel walls of the members and thereby intersect the streams of the gases flowing through the casing or the gases intersecting the material gravitating over the channel members, the material being caused to gravitate from the casing C by the operation of the ejector bars 17 to eject the material accumulating on the grate members 14 from said members through the spaces between the same into the feeding hopper 10. It will be obvious that when the hot gases of combustion exhausted from the kiln are caused to flow through the casing C that the closure member 7 will be positioned to shut off the housing 4 from the stack 6 through the passage 5.

To prevent material gravitating through the casing accumulating between the end walls of the casing and the channel members 31 at the ends of the row of said members, deflector plates 31' of a length equal to the length of the members 31 are arranged to extend between the apex of said channel members and the end walls of the casing, said deflector plates 31' extending parallelly of the members 31 and declining from the casing wall at a less angle than the inclination of the channel walls of said members 31, as clearly shown in Figure 2. By this arrangement passages are provided between the end walls of the casing and the members 31 at the end of the row of said members for the passage of the gases which serve to heat the plates 31' and any material engaging on or passing over said plates.

The housing 4 as well as the conduits 5 and 24 connecting the housing with the stack and casing C may be provided with a lining of refractory material. The casing C may also be constructed of refractory material or the material of the casing having a lining of refractory material, and the grate bars 14 are also provided on the under surface with a facing of refractory material. The damper 34 is adapted to be actuated to shut off and open the portion 27' with the portion 27 of the outlet means by means the operation of which is controlled by the temperature of the gases leaving the casing C and exiting through the stack 6. This means may comprise electrically operated means contained in a casing, shown in a conventional manner at 35 in Figure 2 mounted on the side of the casing C. An arm 36 of said means is connected to an arm 37 fixed on the pivotal support 34' of the damper 34 by links 38 pivotally connected at the opposite ends to the arms 36, 37. Temperature responsive means, shown in a conventional manner at 39, is mounted on the wall of the outlet conduit connecting the outlet of the fan F with the stack and is operatively connected to the temperature actuated means 35 by means 40.

The separator S is shown of the centrifugal type, the outlet means 27 of the casing being connected tangentially to a cylindrical wall portion of the separator adjacent the top thereof to cause the gases entering the separator to flow about and thence upwardly in a tubular member 41 extended downwardly into the separator casing from the outlet of the separator. Material entrained with the gases in their passage through the casing C and separated therefrom in the separator accumulate in a hopper bottom of the separator having an outlet control valve for delivering said material from the separator.

To regulate the passage of material through the casing C and thereby the delivery of material to the kiln, the reciprocatory movement of the ejector bars is adapted to be varied and thereby delivering different amounts of material from the grate bars to the feed chute. For this purpose the eccentric means 21 for actuating the ejector bars is adjustable to vary the stroke of the ejector bars, the eccentric means comprising an eccentric 42 in the form of a disk having an eccentric hub whereby the disk is fixed on the shaft 21' to rotate therewith, as by a key, as shown in Figure 5. A second eccentric member 43 in the form of a ring having a circular opening for engagement of the eccentric 42 is secured thereto by wedges 44, shown as two in number in Fig. 6, engage in peripheral recesses 45 in the eccentric 42, the bottom wall of the recesses inclining from one side toward the opposite side. The wedges are of oblong form in cross section with the bottom of the wedges inclined to correspond to and adapted to engage the bottom wall of the recesses. The top edge of the wedges is of arcuate form the radius of the curve of which is substantially the same as the radius of the opening in the eccentric member 43. The wedges are provided with stems 44' adapted to engage a portion of the recess of reduced size extended to the opposite side of the eccentric and retained therein by an annular flange extended inwardly at the end of the opening in eccentric 43, as at 46. The wedges are drawn to the inclined bottom face of the peripheral recesses 45 in eccentric 42 and the peripheral wall about the opening in the eccentric 43, and thereby locking the eccentrics together by a nut threaded onto the stem of the wedges abutting against a washer interposed between the nut and the ends of the eccentrics, as shown at 47. By loosening the nuts on the stem of the wedges the wedges may be released and the eccentric 43 circularly adjusted about the eccentric 42 to a desired position or positions, which may be indicated on the flange 46 of eccentric 43. After adjustment the eccentric 43 is secured in adjusted position by threading the nuts onto the stem of the wedges. To connect the eccentric means to the head 19 connected to the ejector bars 17 a split collar 48 embraces the periphery of the eccentric 43 with an interposed bearing material such as Babbitt material. The collar sections are arranged with an inwardly extending flange at the opposite ends adapted to engage complemental recesses in the end and opposite sides of the eccentric 42 to prevent lateral displacement of the collar relative to the eccentric. To connect the collar to the ejector bar carrying head 19 a bar fixed to said head is connected to a yoke portion of one of the collar sections 48, as by nuts, as shown in Figures 5 and 6.

By arrangement of the chute 12 to deliver material into the end of the cylinder of the kiln it is subjected to the high temperature heat of the gases of combustion exiting from the kiln. To prevent such gases having an injurious effect upon the chute it is arranged of hollow structure to permit circulating a cooling medium therethrough which may comprise a liquid, such as water, or air. As shown in Figures 3 and 4, the chute is constructed integral with the feeding hopper 10, and the chute and hopper is provided with an integral spaced wall providing a chamber 50 about the hopper and chute for the circulation of the cooling medium. This cooling medium preferably comprises air and for this purpose the jacket is provided with an air inlet and an air outlet, shown in Figure 3 as arranged adjacent the top of the feeding hopper, and may have pipes connected thereto, as at 51, for admission of air to an outlet of air from the jacket, as shown in dotted lines at 52, and are adapted for connection of suction means, such as a fan, to cause air to flow into and through the jacket to the outlet 52 and circulating through the jacket substantially as shown by the arrow. If desired the outlet 52 may be connected to the inlet conduit 30 of the fan F and the heated air exhausted through the stack. The inlets 51 are preferably spaced about one-half of the feed hopper and the outlets disposed about the opposite half of the feed hopper.

While I have shown an embodiment of the invention as means to feed limestone to a limestone calcining kiln and utilizing the hot waste gases of combustion exhausted from the kiln to preheat or precalcine the limestone preliminary to feeding the limestone to the kiln, and is adapted for use to feed coal to pulverizing means preparatory to firing a boiler furnace therewith and utilizing the exhaust gases of combustion of a boiler furnace to expel moisture from and preheat the coal preliminary to pulverizing the same, it may be utilized for feeding hot material and cool the same in its passage through the casing by passing a cooling fluid, such as air, through a bed of material in the casing. It will also be obvious that various modifications may be made in the construction and arrangement of the parts without departing from the scope of the invention and that portions of the invention may be used without others and come within the scope of the invention.

Having described my invention, I claim:

1. In means for heat treating and feeding material, a casing having an open top through which to deliver material into the casing and a grate bottom including laterally spaced bars and arranged with inlet means at one side adjacent the bottom for heated fluid and outlet means for said fluid in the opposite side adjacent the top, means co-operating with the grate bars to support a bed of material in the casing, means reciprocatory transversely of the grate bar to deliver material from said bars to the spaces between the same and cause the bed of material to gravitate downwardly to the grate bars, a row of laterally spaced inverted channel members of progressively decreasing V form in cross section from one end to the opposite end extending transversely of the lower portion of the casing with the end of larger cross section in communication with the inlet means for the heated fluid and the opposite end closed, a pair of superposed rows of like laterally spaced channel members spaced upwardly from and disposed relative to the spaces between the members of the first row extending transversely of the casing with the ends of larger cross section connected in communication with the outlet means and the opposite end closed, whereby fluid admitted into the members in communication with the inlet means passes longitudinally of and laterally from said members and upwardly through the voids of the material in the casing to the upper rows of members and longitudinally from the latter to the outlet means, and a damper operative to open and shut off communication between the lower row of the upper rows of said members and the outlet means to control the extent of the passage of the fluid through the voids of the material in the casing.

2. In means for heat treating and feeding material, a casing having a grate bottom including laterally spaced bars adapted for the passage of material between the same, and means disposed above the grate bars adapted to direct material to and co-operate with the grate bars to support a bed of material thereon in the casing of a depth substantially equal to the depth of the casing, and means reciprocatory between the grate bars and said latter means to deliver material from the grate bars to the space between said bars, said casing having inlets to a side adjacent the bottom for hot gases of combustion and outlet means for said gases from the opposite side adjacent the top of the casing, a series of rows of laterally spaced channel members mounted in inverted position to extend transversely of the casing, the lower row of said members being connected at one end in communication with the gas inlets and closed at the opposite end, and the members of the upper rows arranged in superposed relation above the spaces between the members of the first row and connected at one end in communication with the gas outlet means and closed at the opposite end, the gases being adapted to pass laterally from the lower row of said members upwardly through the bed of material in the casing successively to the next upper row of said members and from the latter to the gas outlet means, and means operative to shut off and open communication between the members of the lower row of said upper rows of members and the gas outlet means to control the extent of the flow of the gases through the bed of the material in the casing.

3. In means for heat treating and feeding material as claimed in claim 2, wherein the means to shut off and open communication between the members of the lower row of the upper rows of members and the outlet means comprises a damper, and means controlled by the temperature of the gases exiting from the casing operative to render the damper actuating means active.

4. In means for heat treating and feeding material into a kiln, a casing adapted for delivery of the material to be treated into the top thereof, a horizontal row of grate bars extending transversely of the body of the casing, connected bars extending parallelly of and spaced above the grate bars, means to reciprocate said connected bars transversely of the grate bars to eject material from the casing through the spaces between said grate bars and cause the material to gravitate through the casing onto the grate bars, bars extending transversely of the casing spaced above and extending parallelly of the ejector bars and intermediate the grate bars arranged to direct material in the casing onto and co-operate with the grate bars to support a bed of material in the casing and relieve the ejector bars of the weight of said bed of material, rows of laterally spaced inverted channel members extending transversely of and spaced vertically in the casing, the lower row of channel members opening at one end through a side wall of the casing and closed at the opposite ends, and the upper rows of channel members opening at one end through the opposite side wall of the casing and closed at the opposite end, means for directing waste hot gases of combustion from a kiln to the open ends of the lower row of channel members, suction means connected to the open ends of the upper rows of channel members operative to induce the flow of the waste hot gases of combustion from the kiln into the lower row of channel members and cause said gases to pass laterally from said channel members in heat transfer relation to the material gravitating through the casing into the upper rows of channel members and through the open ends of said channel members from the casing, and means controlled by the temperature of the gases exiting from the upper rows of channel members operative to control the passage of the hot gases in heat transfer relation to the material gravitating through the casing.

5. In means for heat treating and feeding material into a kiln, a casing into the top of which the material to be treated is adapted to be delivered, laterally spaced bars extending transversely of the bottom of the casing adapted to support a bed of material in the casing, means reciprocatory transversely of said bars to deliver material from the casing through the spaces between said bars and cause the material to gravitate through the casing onto said bars, rows of laterally spaced inverted channel members extending transversely and spaced vertically of the casing with the upper rows extending in parallel superposed relation intermediate the channel members of the lower row, the lower row of channel members opening at one end through a side wall of the casing and closed at the opposite end, and the upper rows of channel members opening at one end through the opposite side wall of the casing and closed at the opposite end, means to connect the open ends of the lower row of channel members with a kiln to direct waste hot gases of combustion from the kiln to said channel members, suction means connected to the open ends of the upper row of channel members to induce the flow of the hot gases into the open end of the lower row of channel members and cause said gases to pass laterally from said channel members in heat transfer relation to the material gravitating through the casing into the upper row of channel members and through the open ends of the latter channel members from the casing, means operative to open and shut off communication between the open ends of an upper row of channel members and the suction means, and thermo operated means rendered operative, by the temperature of the gases exiting from the upper rows of channel members to automatically actuate said means to open and shut off communication between the open ends of said upper row of channel members and the suction means and control the passage of the gases in heat transfer relation to the material gravitating through the casing.

6. In means for heat treating and feeding material into a kiln, a casing into the top of which the material to be treated is delivered, laterally spaced bars extending transversely of the bottom of the casing adapted to support a bed of material in the casing, means reciprocatory transversely of said bars to deliver material from the casing through the spaces between said bars to cause the material to gravitate through the casing onto said bars, a row of laterally spaced inverted channel members of V shape in cross section extending transversely of the lower portion of the casing closed at one end and open at the opposite end and in communication with openings in one side wall of the casing, means in communication with the open ends of said row of channel members through which to conduct waste hot gases of combustion from a kiln into said channel members, a pair of rows of inverted channel members of V shape in cross section extending transversely of and spaced vertically of the casing above the lower row of channel members, said channel members being closed at one end and open at the opposite end and in communication with openings in the opposite side wall of the casing for the outlet of the hot gases from the casing, a fan connected to the open ends of said upper rows of channel members to induce the flow of the waste hot gases from the kiln through the open ends of the lower row of channel members to cause said gases to pass laterally from said channel members and upwardly in heat transfer relation to the material gravitating through the casing into the upper rows of channel members and exit from the open ends of said latter channel members, and means in the connection of the fan with the open ends of the lower row of the pair of rows of channel members operative by the temperature of the gases exiting from the pair of rows of channel members to control the connection of the fan with said row of channel members and regulate the passage of the hot gases in heat transfer relation to the material gravitating through the casing.

7. In means for preparing and feeding material into a kiln, a casing having a grate bottom comprising a horizontal row of laterally spaced grate members and a horizontal row of bars of less width than the grate members spaced upwardly therefrom, certain of said bars being disposed midway the sides of and others relative to and bridging the spaces between said members and arranged to cause material in the casing to gravitate over said bars onto and co-operate with the grate members to support a bed of material in the casing, connected bars of less width than the first bars slidably supported to extend parallelly of and reciprocatory transversely below said first bars to eject material from and through the spaces between the grate members and cause the body of material in the casing to move uniformly downward to said bars and grate members, means to reciprocate the ejector bars, superposed rows of laterally spaced inverted channel members extending transversely of the casing, said channel members being closed at one end and open at the opposite end with the open end of the lowermost channel members opening through a side wall adjacent the bottom of the casing and the open end of the upper channel members opening through the opposite side wall adjacent the top of the casing, and means connected in communication with the open end of the lower channel members for directing hot waste gases of combustion from the kiln into said channel members, and said gases adapted to flow longitudinally of said lower channel members transversely of the casing and from below said channel members in heat transfer relation to the material upwardly through the casing into the upper channel members and along said members through the open end thereof from the casing.

8. In means for preparing and feeding material into a kiln, a casing open at the top for delivering material therethrough into the casing and having a grate bar bottom arranged to support and retain a bed of material in the casing, means reciprocatory transversely of the grate bar bottom to deliver material from the casing through the spaces between the grate bars and cause the body of material to move uniformly downward in the casing to the grate bar bottom, a chute to direct the material delivered from the casing into the kiln, inverted channel members open at one end and closed at the opposite end extending transversely and spaced laterally and upwardly in the casing and over which channel members the material in the casing gravitates, the open end of the lower channel members opening through a side wall adjacent the bottom of the casing and the open end of the channel members spaced upwardly from the lower channel members opening through the opposite side wall adjacent the top of the casing, and means enclosing the chute for directing hot waste gases of combustion of the kiln into the open end of the lower channel members, and said gases flowing from below said channel members upwardly in the casing in heat transfer relation to the material into and directed through the open end of the upper channel members from the casing.

9. In means for preparing and feeding material into a kiln, a hopper having a grate bar closure at the outlet to support and discharge material therethrough from the hopper, a casing open at the top and in communication with the hopper outlet to receive material from the hopper through the grate bar closure at the hopper outlet, said casing having a grate bottom comprising a pair of horizontal rows of parallel and laterally spaced bars extending transversely of the casing and spaced upwardly from each other, the upper row of bars being arranged to direct material onto and co-operate with the lower row of bars to support a bed of material in the casing, ejector bars reciprocatory transversely below the upper row of said grate bars operative to deliver material from and through the spaces between the lower grate bars and cause the body of material to move uniformly downward to the grate bottom and from the hopper into the casing, inverted channel members closed at one end and open at the opposite end extending transversely of and spaced laterally and vertically of the casing, the open end of the lower channel members opening through a side wall adjacent the bottom of the casing adapted to receive therethrough hot waste gases of combustion of the kiln and the open end of the upper channel members opening through the opposite side wall adjacent the top of the casing, suction means connected to the open end of the upper channel members operative to cause the gases entering the open end of the lower channel members to flow longitudinally of said channel members transversely of the casing and laterally therefrom upwardly through the casing in heat transfer relation to the material gravitating over the channel members through the casing into and out of the open end of the upper channel members, and means to regulate the connection of the suction means with the upper channel members.

10. In means for preparing and feeding material into a kiln, a casing open at the top for delivering material therethrough into the casing and having a grate bar bottom comprising a laterally spaced horizontal row of grate members extending transversely of the casing and a laterally spaced horizontal row of bars of less width than the grate members extending parallelly of and spaced above the grate members, certain of said bars being disposed midway the sides of the grate members and others to bridge the spaces between the grate members and arranged to direct material to opposite sides of the bars onto and co-operate with the grate members to support a bed of material in the casing, connected bars of less width than the grate bars supported to extend parallelly of and have reciprocatory movement transversely below said grate bars above the grate members to eject material from and through the spaces between the grate members and cause the bed of material in the casing to move uniformly downward to the grate bottom, and means to reciprocate the ejector bars.

JOSEPH E. KENNEDY.